(12) United States Patent
Hopkins

(10) Patent No.: US 8,041,052 B2
(45) Date of Patent: Oct. 18, 2011

(54) CIRCUIT FOR PRIORITY SELECTION OF AUDIO SIGNALS

(75) Inventor: Thomas L. Hopkins, Mundelein, IL (US)

(73) Assignee: STMicroelectronics, Inc., Coppell, TX (US)

( * ) Notice: Subject to any disclaimer, the term of this patent is extended or adjusted under 35 U.S.C. 154(b) by 1258 days.

(21) Appl. No.: 11/683,645

(22) Filed: Mar. 8, 2007

(65) Prior Publication Data

US 2008/0219480 A1 Sep. 11, 2008

(51) Int. Cl.
*H04B 3/00* (2006.01)
(52) U.S. Cl. .............. 381/81; 381/80; 381/85; 381/123
(58) Field of Classification Search .................... 381/80, 381/81, 85, 86, 77, 123, 104, 11, 12; 455/3.06, 455/567; 700/94; 702/65; 725/75
See application file for complete search history.

(56) References Cited

U.S. PATENT DOCUMENTS

| | | | | |
|---|---|---|---|---|
| 4,306,114 A * | 12/1981 | Callahan | ....................... | 381/119 |
| 5,034,808 A * | 7/1991 | Murray | ........................... | 725/75 |
| 5,144,548 A * | 9/1992 | Salandro | ........................... | 700/9 |
| 6,091,812 A * | 7/2000 | Iglehart et al. | ................. | 379/308 |
| 6,868,296 B1 * | 3/2005 | Arikuma et al. | ................. | 700/94 |
| 7,058,189 B1 * | 6/2006 | Grimm et al. | .................. | 381/119 |
| 7,162,038 B1 * | 1/2007 | Winterer et al. | ................. | 381/11 |
| 7,162,381 B2 * | 1/2007 | Boor et al. | ...................... | 702/65 |
| 7,190,798 B2 * | 3/2007 | Yasuhara | ........................ | 381/86 |
| 7,340,070 B2 * | 3/2008 | Nakata | ........................... | 381/110 |
| 2004/0185773 A1 * | 9/2004 | Gerber et al. | ................. | 455/3.06 |
| 2005/0288067 A1 * | 12/2005 | Wainwright | .................. | 455/567 |
| 2006/0126854 A1 * | 6/2006 | Noto | ............................... | 381/19 |

\* cited by examiner

*Primary Examiner* — Vivian Chin
*Assistant Examiner* — Friedrich W Fahnert
(74) *Attorney, Agent, or Firm* — Lisa K. Jorgenson

(57) ABSTRACT

An audio selection circuit. The audio selection circuit includes a control/switch circuit having a first input, a second input, and a first output, and a signal detector module configured to detect an audio signal on the second input. If the signal detector detects presence of the audio signal on the second input, the signal detector is configured to transmit a control signal to the control/switch circuit, and the control/switch circuit is configured in response to the control signal to disconnect the first input from the first output and to connect the second input to the first output. Otherwise, the control/switch circuit is configured to connect the first input to the first output and to disconnect the second input from the first output.

18 Claims, 8 Drawing Sheets

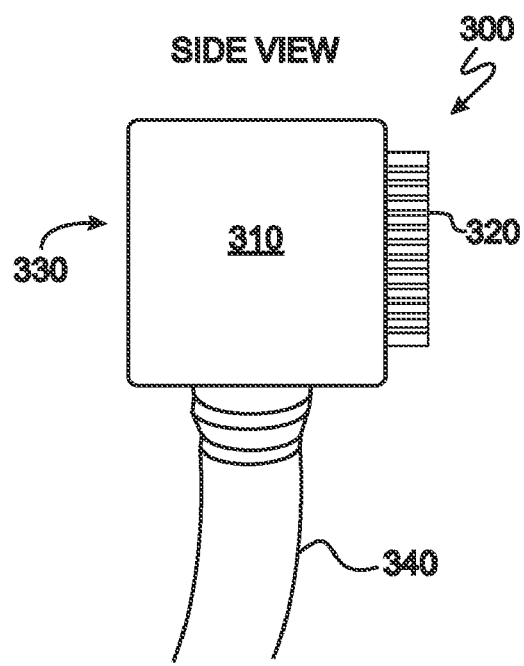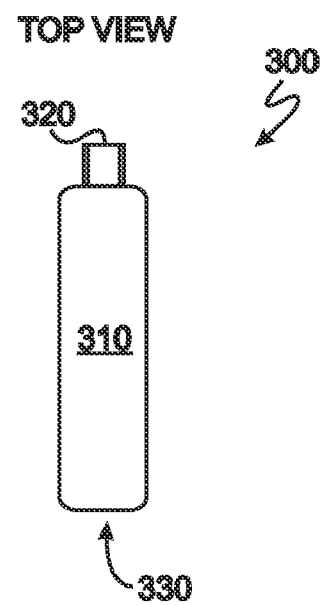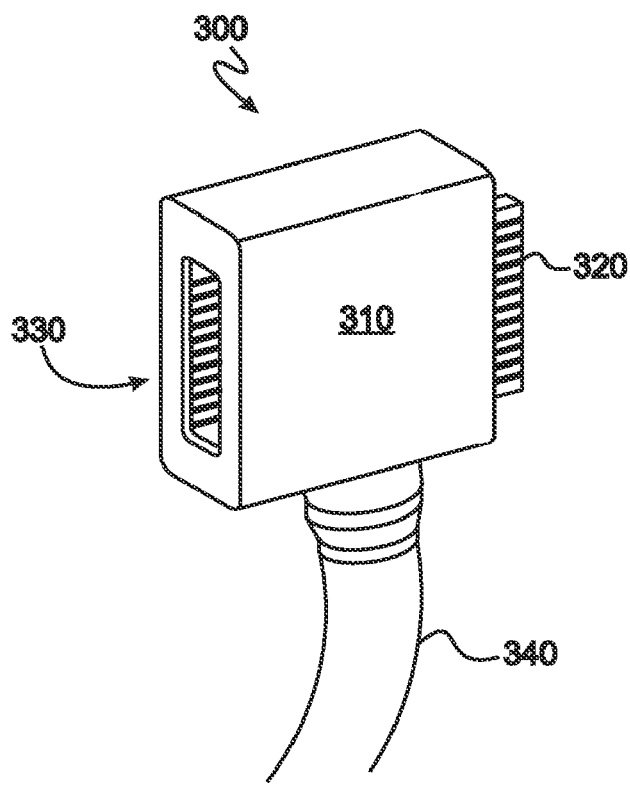
FIG. 3A
FIG. 3B
FIG. 3C

CIRCUIT FOR PRIORITY SELECTION OF AUDIO SIGNALS

BACKGROUND

A great number of portable audio devices such as cellular telephones, MP3 players, CD players, XM radio receivers and other devices are not readily useable with the audio systems found in most automobiles. In addition, some other aftermarket devices, such as global positioning satellite (GPS) navigation systems, produce audio prompts that are not compatible with current automobile audio systems. Most automobile audio systems do not provide auxiliary audio inputs for external devices such as the above. Unlike home stereo systems which typically have several external input options and one or more controls for selecting one of those input options, automotive audio systems typically have few or none. Automotive audio systems have limited available space for selection controls and input connectors on the front panel and similarly limited space for input connectors on the back of the system.

Audio output from some external audio devices, specifically from MP3 players and XM radio receivers, can be inputted to a car radio receiver by first using the audio signal from the external device to frequency modulate a radio frequency signal having the same frequency as that of the IF frequency of the receiver. Then a low power FM transmitter is used to transmit the frequency modulated signal directly to the IF amplifier in the receiver. Following which the receiver demodulates the received signal, thereby recovering the audio signal.

In another technique, audio output from external audio devices can be inputted to the car radio receiver by first using the audio signal from the external device to frequency modulate a radio frequency signal having a frequency that lies within the reception band of the receiver. Then a low power FM transmitter transmits the frequency modulated signal directly to the antenna of the receiver. The audio signal is then extracted by the receiver just as if it were received from a commercial FM radio station. For this technique, the FM radio must be tuned to the selected transmission frequency.

Also, for those car stereos which have a tape player, devices having the same shape as a tape cassette are available which include a transducer for magnetically coupling the audio signal from the external audio source to the magnetic tape head in the tape player.

In addition, a few automotive audio systems currently do have auxiliary inputs for MP3 players or GPS navigation systems. But, such systems are primarily limited to specific brand combinations of specific devices.

SUMMARY

In a representative embodiment, an audio selection circuit comprises a control/switch circuit having a first input, a second input, and a first output and comprises a signal detector module configured to detect an audio signal on the second input. If the signal detector detects presence of the audio signal on the second input, the signal detector is configured to transmit a control signal to the control/switch circuit, and the control/switch circuit is configured in response to the control signal to disconnect the first input from the first output and to connect the second input to the first output. Otherwise, the control/switch circuit is configured to connect the first input to the first output and to disconnect the second input from the first output.

In another representative embodiment, an audio selection circuit, comprises a control/switch circuit having a first input, a second input, a third input, a fourth input, a first output, and a second output and comprises a signal detector module configured to detect an audio signal on the second and the fourth inputs. If the signal detector detects the presence of the audio signal on at least one of the second and the fourth inputs, the signal detector is configured to transmit a control signal to the control/switch circuit, and the control/switch circuit is configured in response to the control signal to disconnect the first and the third inputs respectively from the first and the second outputs and to connect the second and the fourth inputs respectively to the first and the second outputs. Otherwise, the control/switch circuit is configured to connect the first and the third inputs respectively to the first and the second outputs and to disconnect the second and the fourth inputs respectively from the first and the second outputs.

In yet another representative embodiment, an audio selection circuit comprises a control/switch circuit having a first input, a second input, and a first output and comprises a logic control module having a first logic module input configured to receive a first presence signal and a second logic module input configured to receive a second presence signal. The first presence signal indicates presence or absence of an audio signal on the first input, and the second presence signal indicates presence or absence of an additional audio signal on the second input. If the second presence signal indicates presence of the additional audio signal, the control/switch circuit is configured to disconnect the first input from the first output and to connect the second input to the first output. Otherwise, the control/switch circuit is configured to connect the first input to the first output and to disconnect the second input from the first output. If at least one of the first and the second presence signals indicates presence of its associated audio signal, the logic control module outputs a presence output signal indicating presence of one of the two audio signals on the first output. Otherwise, the logic control module outputs a presence output signal indicating absence of both the first and the second audio signals on the first output.

In still another representative embodiment, an audio selection circuit, comprises a control/switch circuit having a first input, a second input, a third input, a fourth input, a first output, and a second output and comprises a logic control module having a first logic module input configured to receive a first presence signal and a second logic module input configured to receive a second presence signal. The first presence signal indicates presence or absence of an audio signal on at least one of the first and third inputs, and the second presence signal indicates presence or absence of an additional audio signal on at least one of the second and fourth inputs. If the second presence signal indicates presence of the additional audio signal, the control/switch circuit is configured to disconnect the first input from the first output, to disconnect the third input from the second output, to connect the second input to the first output, and to connect the fourth input to the second output. Otherwise, the control/switch circuit is configured to connect the first input to the first output, to connect the third input to the second output, to disconnect the second input from the first output, and to disconnect the fourth input from the second output. If at least one of the first and the second presence signals indicates presence of its associated audio signal, the logic control module outputs a presence output signal indicating presence of one of the two audio signals on at least one of the first and the second outputs. Otherwise, the logic control module outputs a presence output signal indicating absence of both the first and the second audio signals on both the first and the second outputs.

Other aspects and advantages of the representative embodiments presented herein will become apparent from the following detailed description, taken in conjunction with the accompanying drawings.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

FIG. 3A is a side view of a stackable plug comprising the audio selection circuit of FIG. 1.

FIG. 3B is a side view of the stackable plug of FIG. 3A.

FIG. 3C is a perspective view of the stackable plug of FIG. 3A.

DETAILED DESCRIPTION

Figure 1:
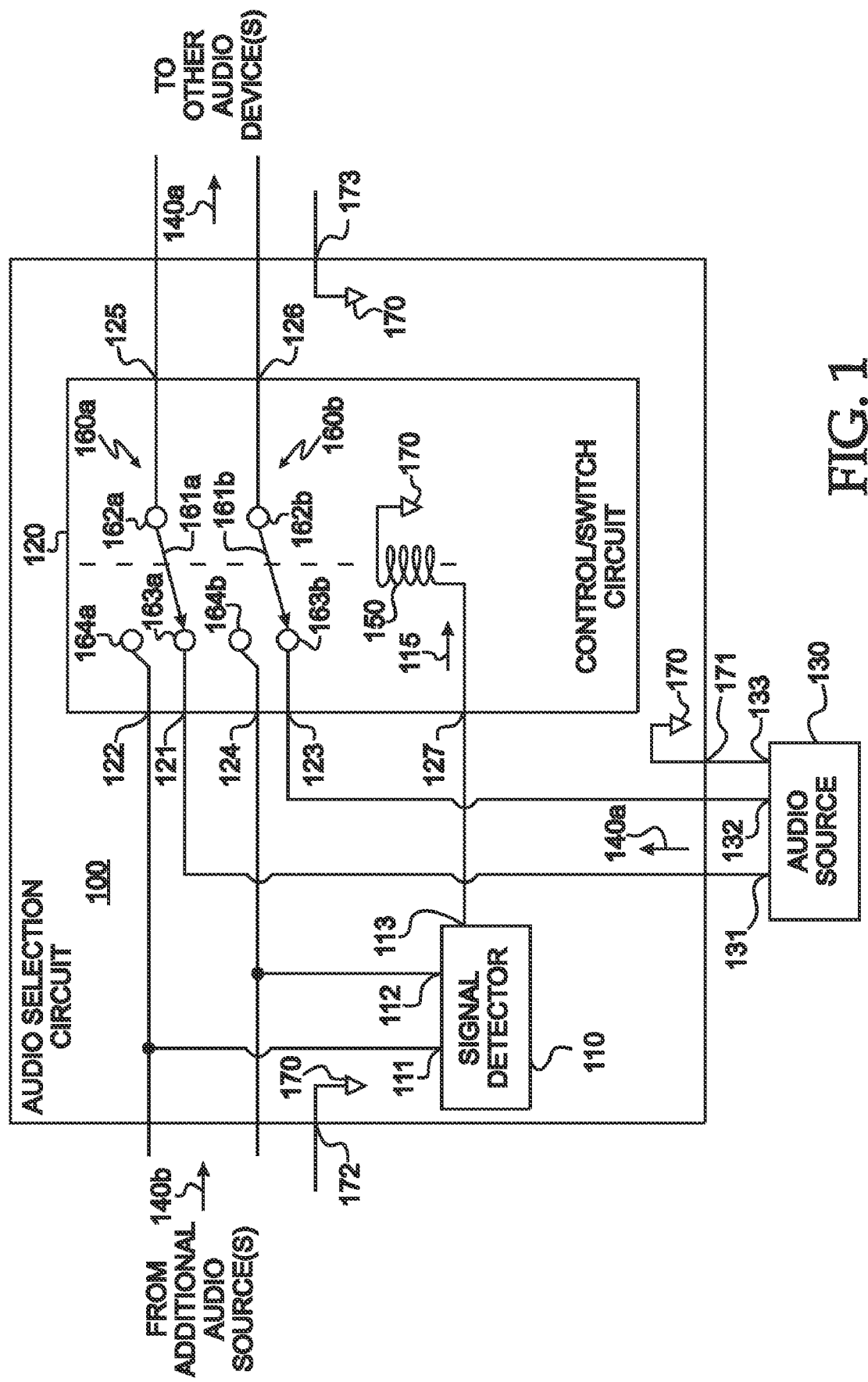
FIG. 1 is a diagram of an audio selection circuit as described in various representative embodiments.

As shown in the drawings for purposes of illustration, novel techniques are disclosed herein for providing an interface circuit that enables the connection of one or more external, auxiliary devices to an audio system without requiring additional controls on the control panel of the audio system. The circuits disclosed herein also permit the user to specify a relative priority to each of the attached auxiliary devices such that a device having a higher priority assigned to it will interrupt another device having a lower priority whenever a signal is received from the higher priority device. For example, the priority assigned to a global positioning satellite (GPS) navigation system might be higher than that assigned to the signal from a cellular telephone. In which case, the audio directions from the GPS navigation system would interrupt and override that of the cellular telephone.

However, in some applications multiple devices such as a cellular telephone, an MP3 player, and a GPS navigation system may be connected to the audio system. In such cases, the circuits disclosed herein permit the identification of an interrupt priority for each auxiliary device. For example a user that has a GPS navigation system, a cellular telephone, and a MP3 player may assign the highest priority to the GPS navigation system, the next highest priority to the cellular telephone, and the lowest priority to the MP3 player. In this arrangement the audio from the source selected on the control panel of the car stereo (AM tuner, FM tuner, CD, tape player, etc.) would be assigned the lowest priority. If the user were listening to a program from the FM receiver when a call was received on the cellular telephone, the FM program would be muted by the ring tone and by any subsequent incoming audio from the cellular telephone with these signals being played through the car stereo system. The GPS navigation system having been assigned the highest priority would interrupt any input from a lower priority source and be played through the stereo overriding the audio source from any of the lower priority devices (the cellular telephone, the MP3 player, or the FM receiver).

Previous techniques for outputting audio signals from external, auxiliary electronic components have used several techniques. None of the techniques provide for the assignment of a priority interrupt initiated by the reception of an audio signal. All of the techniques have their own disadvantages. In particular, transmitting a frequency modulated radio frequency signal having the same frequency as that of the IF frequency of the receiver is susceptible to interference between the signal from the external device and any signal received at the antenna of the radio receiver unless the receiver is tuned to a frequency off of that of any potential signal received at the antenna. Also, if the audio output from an external audio device is used to frequency modulate a radio frequency signal having a frequency that lies within the reception band of the receiver, the FM radio must be tuned to the selected transmission frequency. In this case, automatic priority interruption of a signal from an FM radio station is not possible. This is also the case for those applications in which a transducer magnetically couples the audio signal from the external audio source to the tape head in the tape player. In none of these cases is it possible to provide for the automatic interrupt of the audio signal from even a single source. Whereas, using the circuits and techniques disclosed herein multiple audio sources can be interrupted by other audio sources in the order of the previously assigned priority.

In the following detailed description and in the several figures of the drawings, like elements are identified with like reference numerals.

FIG. 1 is a diagram of an audio selection circuit 100 as described in various representative embodiments. In FIG. 1, the audio selection circuit 100 comprises a signal detector module 110 and a control/switch circuit 120. The signal detector module 110 has a first detector input 111, a second detector input 112, and a detector output 113. The control/switch circuit 120 has a first input 121, a second input 122, a third input 123, a fourth input 124, a first output 125, a second output 126, and a control input 127. The first detector input 111 is electrically connected to the second input 122; the second detector input 112 is electrically connected to the fourth input 124, and the detector output 113 is electrically connected to the control input 127. An audio source 130 having a first audio output 131 and a second audio output 132 can be optionally connected to the control/switch circuit 120 in the audio selection circuit 100 by connecting the first and the second audio outputs 131,132 respectively to the first and third inputs 121,123. FIG. 1 shows a first audio signal 140a being received from the first and second audio outputs 131, 132 of the audio source 130 at first and third inputs 121,123 and a possible second audio signal 140b being received from one of one or more additional audio sources 130 at second and fourth inputs 122,124. First and second audio signals 140a, 140b are referred to in general as audio signals 140.

FIG. 1 is configured for stereo audio inputs at paired first and third inputs 121,123 with first ground point 171 at chassis ground potential 170 connected to third audio output 133 and separately at second and fourth inputs 122,124 with second ground point 172 at chassis ground potential 170. Stereo audio output is obtained at paired first and second outputs 125,126 with third ground point 173 at chassis ground potential 170. For monaural input it is only necessary to use first input 121 with first ground point 171 at chassis ground potential 170 and separately only second input 122 with second ground point 172 also at chassis ground potential 170. And, for monaural output it is only necessary to use first output 125 with third ground point 173 at chassis ground potential 170.

If the signal detector module 110 detects the presence of the second audio signal 140b on at least one of the second and the fourth inputs 122,124, the signal detector module 110 transmits a control signal 115 from the detector output 113 to the control input 127 of the control/switch circuit 120. The control signal 115 received by the control/switch circuit 120 forces connection in the control/switch circuit 120 of the second and the fourth inputs 122,124 respectively to the first and the second outputs 125,126. However, if as indicated in the case of FIG. 1, the second audio signal 140b is not present on at least one of the second and the fourth inputs 122,124, the signal detector module 110 should not detect the presence of the second audio signal 140b and will not transmit a control signal 115 from the detector output 113 to the control input 127 of the control/switch circuit 120. In such case, the first and the third inputs 121,123 are connected respectively to the first and the second outputs 125,126 in the control/switch circuit 120.

In the representative embodiment of FIG. 1, the control/switch circuit 120 is a non-latching, double-pole, double-throw relay switch 120 that comprises a relay coil 150 connected between the control input 127 and the chassis ground potential 170, a first switch section 160a, and a second switch section 160b. The first switch section 160a comprises a first pole 161a connected to a first common terminal 162a, a first first-throw terminal 163a connected to the first input 121, and a first second-throw terminal 164a connected to the second input 122. The second switch section 160b comprises a second pole 161b connected to a second common terminal 162b, a second first-throw terminal 163b connected to the third input 123, and a second second-throw terminal 164b connected to the fourth input 124. The first and the second switch sections 160a,160b are referred to in general as the switch sections 160; the first and the second poles 161a,161b are referred to in general as the poles 161; the first and the second common terminals 162a,162b are referred to in general as the common terminals 162; the first and the second first-throw terminals 163a,163b are referred to in general as the first-throw terminals 163; and the first and the second second-throw terminals 164a,164b are referred to in general as the second-throw terminals 164. For monaural input the control/switch circuit 120 is a non-latching, single-pole, double-throw relay switch 120 that comprises the relay coil 150 connected between the control input 127 and the chassis ground potential 170 and the first switch section 160a connected as shown in FIG. 1.

If the control signal 115 is received by the control input 127, the relay coil 150, which has contacts at the control input 127 and at fourth ground point 174 at the chassis ground potential 170, is activated forcing connection of the pole 161a of the first section 160a to the second input 122 via first second-throw terminal 164a and forcing connection of the pole 161b of the second section 160b to the fourth input 124 via second second-throw terminal 164b. Otherwise, the pole 161a of the first section 160a is connected to the first input 121 via first first-throw terminal 163a and the pole 161b of the second section 160b is connected to the third input 123 via second first-throw terminal 163b.

Figure 2:
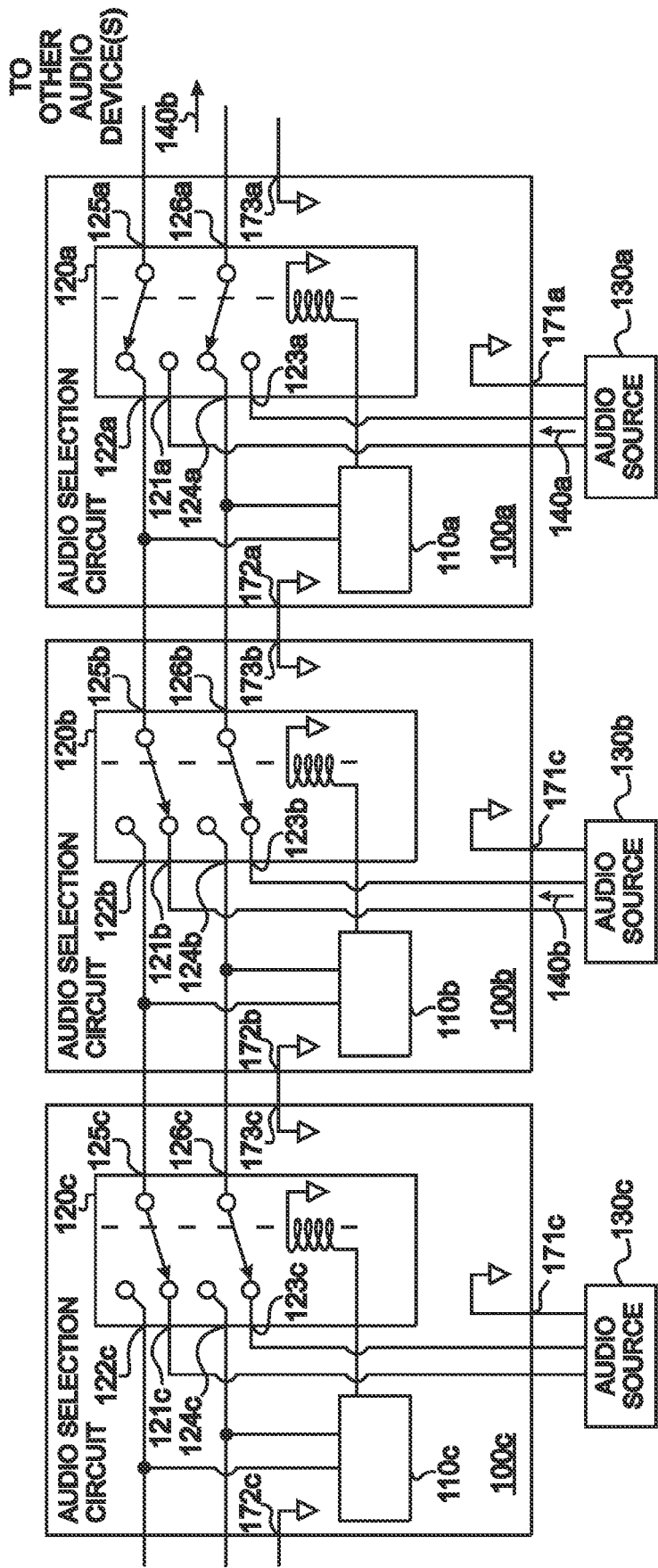
FIG. 2 is a diagram of a combination of three of the audio selection circuits shown in FIG. 1.

FIG. 2 is a diagram of a combination of three of the audio selection circuits 100 shown in FIG. 1. In the representative embodiment of FIG. 2, a first audio source 130a is connected to a first audio selection circuit 100a in a manner as shown in and described with respect to FIG. 1; a second audio source 130b is connected to a second audio selection circuit 100b in a manner as shown in and described with respect to FIG. 1; and a third audio source 130c is connected to a third audio selection circuit 100c in a manner as shown in and described with respect to FIG. 1. In the configuration of FIG. 2, an additional audio selection circuit 100 or an additional audio source 130 is not connected to the second and fourth inputs 122c,124c and the second ground point 172c of the third audio selection circuit 100c.

Note that the chassis ground 170c of the third audio selection circuit 100c is connected to the chassis ground 170b of the second audio selection circuit 100b via connection of the third ground point 173c of the third audio selection circuit 100c to the second ground point 172b of the second audio selection circuit 100b, and that the chassis ground 170b of the second audio selection circuit 100b is connected to the chassis ground 170a of the first audio selection circuit 100a via connection of the third ground point 173b of the second audio selection circuit 100b to the second ground point 172a of the first audio selection circuit 100a.

While the third audio source 130c is connected to the third audio selection circuit 100c and may be turned on, the third audio source 130c is, as indicated in the configuration of FIG. 2, in a mode wherein it is not outputting an audio signal. The third audio source 130c could be, for example, a GPS navigation system 130c which is actively assessing the position of the vehicle in which it is being used but is not currently reporting progress via an audio signal. Since an audio signal is absent on the second and fourth inputs 122c,124c to the third audio selection circuit 100c, the first and second outputs 125c,126c of the third audio selection circuit 100c will be connected to the third audio source 130c through the first and third inputs 121c,123c of a third control/switch circuit 120c as shown in FIG. 2. And, since an audio signal is absent on the second and fourth inputs 122b,124b to the second audio selection circuit 100b, the first and second outputs 125b,126b of the second audio selection circuit 100b will be connected to the second audio source 130b through the first and third inputs 121b,123b of a second control/switch circuit 120b as shown in FIG. 2. Assuming that the second audio signal 140b is present on the second and fourth inputs 122a,124a to the first audio selection circuit 100a, the first and second outputs 125a,126a of the first audio selection circuit 100a will be connected to the second audio source 130b through the first and third inputs 121a,123a of a first control/switch circuit 120a and the second control/switch circuit 120b as shown in FIG. 2. Thus, since audio from the second audio source 130b has a higher priority than audio from the first audio source 130a, the first audio signal 140a from the first audio source 130a is preempted by the audio from the second audio source 130b. As an example, the second audio source 130b could be a cellular telephone unit 130b, and the first audio source 130a could be the first stages of an automobile's receiver/stereo 130a. In this example, the audio from the automobile's receiver/stereo 130a is preempted by a ring or a conversation on the cellular telephone unit 130b which will be preempted by the GPS navigation system 130c whenever it has information to verbally report. For the condition shown in FIG. 2, should the conversation on the cellular telephone end, the first audio source 130a (the automobile's receiver/stereo 130a) will be reconnected to the first and the second outputs 125a, 126a.

FIG. 3A is a side view of a stackable plug 300 comprising the audio selection circuit 100 of FIG. 1. FIG. 3B is a side view of the stackable plug 300 of FIG. 3A. FIG. 3C is a perspective view of the stackable plug 300 of FIG. 3A. The stackable plug 300 comprises an electronic plug housing 310, a male jack section 320, a female receptacle section 330, and a cable 340. In the representative embodiment of FIGS. 3A-3C, the male jack section 320 comprises the first and the second outputs 125,126, the female receptacle section 330 comprises the second and the fourth inputs 122,124, and the cable 340 comprises the first and the third inputs 121,123. Also, the housing 310 comprises the signal detector module 110 and the control switch circuit 120. Thus, the audio selection circuit 100 is constructed within the plug 300. Further, the plug 300 is configured such that the male jack section 320 is insertable into the female receptacle section 330 of another plug 300. For any given application, the number of insertable plugs 300 that will be combined is limited only by the practical aspects of signal loss and mechanical stability.

Figure 4:
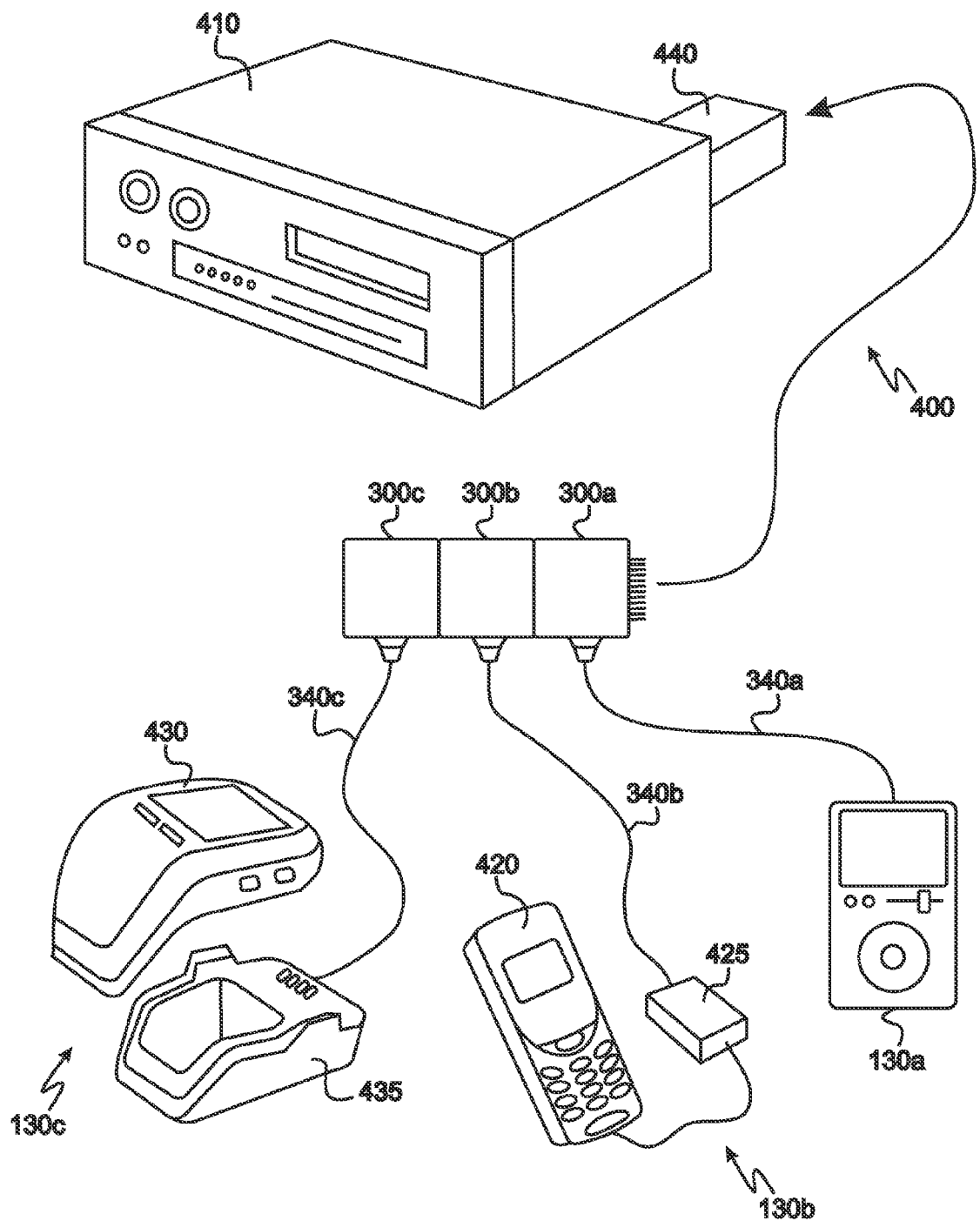
FIG. 4 is a drawing of a representative application of the audio selection circuits of FIGS. 1-2 and 3A-3C.

FIG. 4 is a drawing of a representative application of the audio selection circuits 100 of FIGS. 1-2 and 3A-3C. In FIG. 4, three separate audio input devices 130 which in this embodiment are the MP3 player 130a, the cellular telephone unit 130b, and the GPS system unit 130c are connected respectively to a first, a second, and a third stackable plugs 300a,300b,300c via respectively first, second, and third cables 340a,340b,340c. The cellular telephone unit 130b comprises a cellular telephone 420 and an adapter 425. The cellular telephone 420 connects to the second cable 340b through the adapter 425. The GPS system unit 130c comprises a GPS navigation system 430 and a docking station 435. The GPS navigation system 430 connects to the third cable 340c through the docking station 435.

The first, second, and third stackable plugs 300a,300b, 300c each comprise an audio selection circuit 100 as previously described. The third plug 300c is plugged into the second plug 300b, and the second plug 300b is plugged into the first plug 300a. The first plug in turn is plugged into a receptacle 440 mounted on or as a part of an audio output device 410. The audio output device 410 could be a car receiver/stereo system 410 or other appropriate device. Typically a fourth audio selection circuit 100d (not shown in the figures) would be constructed internally as a part of or attached to the car receiver/stereo system 410. This fourth audio selection circuit 100d would be configured to receive its second and fourth inputs 122d,124d (not shown in the figures) from the first and second outputs 125a,126a of the first audio selection circuit 110a constructed in the first stackable plug 300a. The first and third inputs 121d,123d (not shown in the figures) of the fourth audio selection circuit 100d could receive its inputs from the reception/detection stages 130d (not shown in the figures) of the car receiver/stereo system 410, and the first and second outputs 125d,126d (not shown in the figures) could be attached to the audio output stages of the car receiver/stereo system 410. The audio output stages of the car receiver/stereo system 410 could include one or more stages of audio amplification and speakers.

In a manner similar to that shown in FIG. 2, since audio from the MP3 player 130a has a higher priority than audio from the reception/detection stages 130d of the car receiver/ stereo system 410, the audio signal 140d (not shown in the figures) from the reception/detection stages 130d of the car receiver/stereo system 410 is preempted by the MP3 player 130a. In this example, audio from the reception/detection stages 130d of the car receiver/stereo system 410 is preempted by music from the MP3 player 130a which is preempted by a ring or a conversation on the cellular telephone 420 which will be preempted by the GPS navigation system 430 whenever it has information to verbally report. For the condition shown in FIG. 4, should the GPS navigation system 430 have nothing to report, the conversation on the cellular telephone unit 130b end, and the MP3 player 130a be turned off, audio from the reception/detection stages 130d of the car receiver/stereo system 410 will be connected to the audio output stages of the car receiver/stereo system 410.

Figure 5:
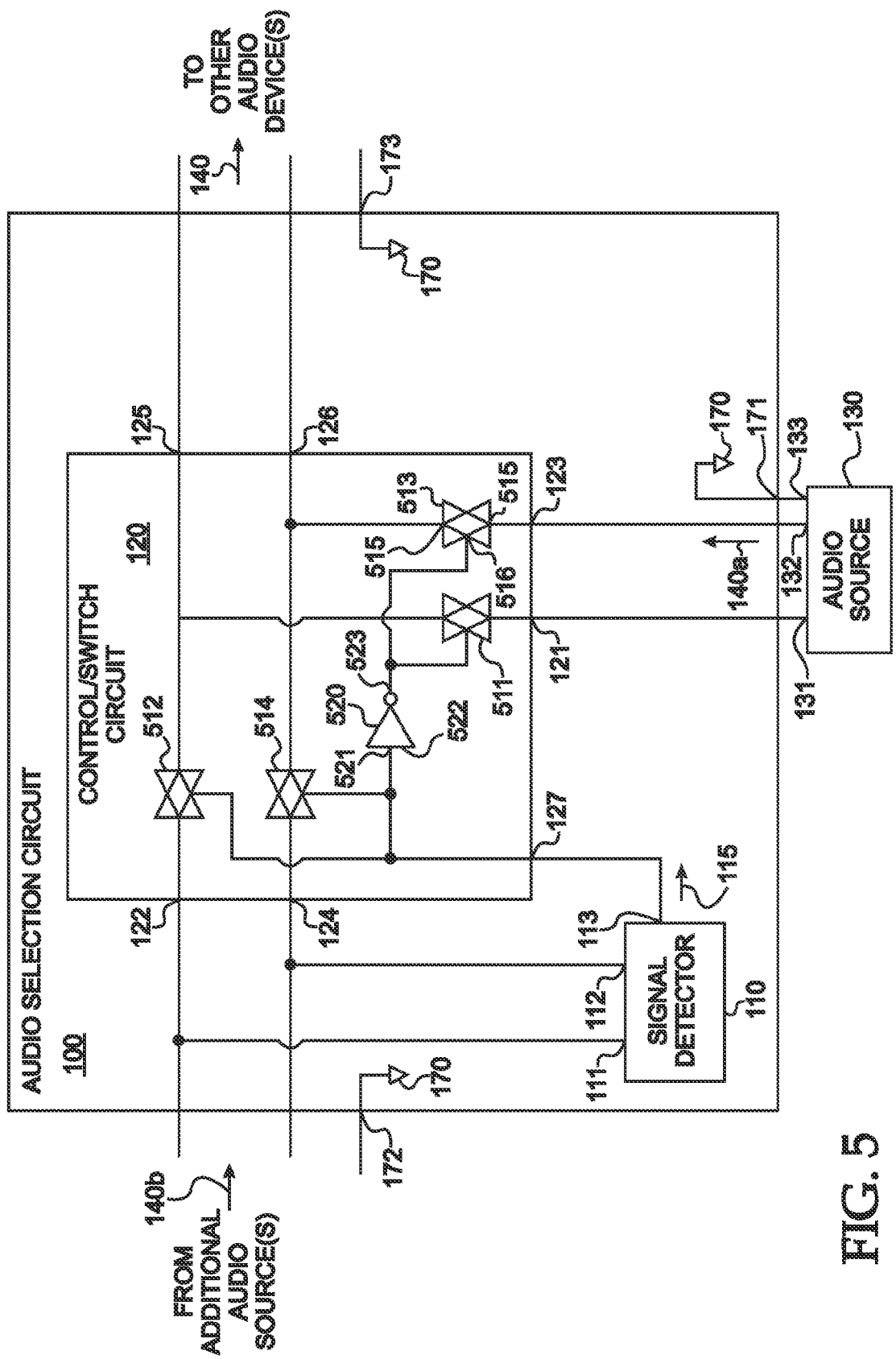
FIG. 5 is a diagram of another audio selection circuit as described in various representative embodiments.

FIG. 5 is a diagram of another audio selection circuit 100 as described in various representative embodiments. As in FIG. 1, the audio selection circuit 100 comprises a signal detector module 110 and a control/switch circuit 120. In FIG. 5, the relay coil 150 and switch sections 160 of the control/switch circuit 120 in FIG. 1 are replaced with a first analog transmission gate 511, a second analog transmission gate 512, a third analog transmission gate 513, a fourth analog transmission gate 514, and an inverter 520 having an inverter input 521 and an inverter output 523. The first, second, third, and fourth analog transmission gates 511,512,513,514 have two transmission terminals 515 which for clarity of illustration are shown only on the first analog transmission gate 511 in the drawings. Also, the first, second, third, and fourth analog transmission gates 511,512,513,514 are turned on and off via control gates 516 on each of the analog transmission gates. The signal detector module 110 has a first detector input 111, a second detector input 112, and a detector output 113. The control/switch circuit 120 has a first input 121, a second input 122, a third input 123, a fourth input 124, a first output 125, a second output 126, and a control input 127. The first detector input 111 is electrically connected to the second input 122; the second detector input 112 is electrically connected to the fourth input 124; and the detector output 113 is electrically connected to the control input 127. An audio source 130 having a first audio output 131 and a second audio output 132 can be optionally connected to the control/switch circuit 120 in the audio selection circuit 100 by connecting the first and the second audio outputs 131,132 respectively to the first and third inputs 121,123. FIG. 1 shows a first audio signal 140a being received from the audio source 130 at first and third inputs 121,123 and a possible second audio signal 140b being received from one of one or more additional audio sources 130 at second and fourth inputs 122,124. First and second audio signals 140a,140b are referred to in general as audio signals 140.

FIG. 5 is configured for stereo audio inputs at paired first and third inputs 121,123 with first ground point 171 at chassis ground potential 170 connected to third audio output 133 and separately at second and fourth inputs 122,124 with second ground point 172 at chassis ground potential 170. Stereo audio output is obtained at paired first and second outputs 125,126 with third ground point 173 at chassis ground potential 170. For monaural input it is only necessary to use first input 121 with first ground point 171 at chassis ground potential 170 and separately only second input 122 with second ground point 172 also at chassis ground potential 170. And, for monaural output it is only necessary to use first output 125 with third ground point 173 at chassis ground potential 170.

If the signal detector module 110 detects the presence of the second audio signal 140b on at least one of the second and the fourth inputs 122,124, the signal detector module 110 transmits a control signal 115 from the detector output 113 to the control input 127 of the control/switch circuit 120. The control signal 115 received by the control/switch circuit 120 forces connection in the control/switch circuit 120 of the second and the fourth inputs 122,124 respectively to the first and the second outputs 125,126. However, if the second audio signal 140b is not present on at least one of the second and the fourth inputs 122,124, the signal detector module 110 will not detect the presence of the second audio signal 140b and will not transmit a control signal 115 from the detector output 113 to the control input 127 of the control/switch circuit 120. In such case, the first and the third inputs 121,123 are connected respectively to the first and the second outputs 125,126 in the control/switch circuit 120.

In the representative embodiment of FIG. 5, the control/switch circuit 120 is a double-pole, double-throw solid state switch 120 comprising the inverter 520 having input connected to the control input 127, the first analog transmission gate 511 connected between the first input 121 and the first output 125, the second analog transmission gate 512 connected between the second input 122 and the first output 125, the third analog transmission gate 513 connected between the third input 123 and the second output 126, and the fourth analog transmission gate 514 connected between the fourth input 124 and the second output 126. Control gates 516 of the first and the third analog transmission gates 511,513 are connected to the output of the inverter 520, and control gates 516 of the second and the fourth analog transmission gates 512, 514 are connected to the detector output 113. Control gates 516 of the first, the second, the third and the fourth analog transmission gates 511,512,513,514 are shown without the normal opposite polarity connection.

For monaural input/output the control/switch circuit 120 is a non-latching, single-pole, double-throw solid state switch 120 comprising the inverter 520 having input connected to the control input 127, the first analog transmission gate 511 connected between the first input 121 and the first output 125 the second analog transmission gate 512 connected between the second input 122 and the first output 125. The control gate 516 of the first analog transmission gate 511 is connected to the output of the inverter 520, and the control gate 516 of the second analog transmission gate 512 is connected to the control input 127.

In a manner similar to that of FIG. 1, if the control signal 115 is received by the control input 127, the control signal 115 from the signal detector module 110 turns off (the OFF state) the first and the third analog transmission gates 511,513 and turns on (the ON state) the second and the fourth analog transmission gates 512,514. In which case, the second input 122 is connected to the first output 125, the fourth input 124 is connected to the second output 126, and the first and the third inputs 121,123 are disconnected respectively from the first output 125 and the second output 126. Otherwise, the first and the third analog transmission gates 511,513 are turned on (the ON state) and the second and the fourth analog transmission gates 512,514 are turned off (the OFF state). In this case, the first input 121 is connected to the first output 125; the third input 123 is connected to the second output 126; and the second and the fourth inputs 122,124 are disconnected respectively from the first output 125 and the second output 126.

Figure 6:
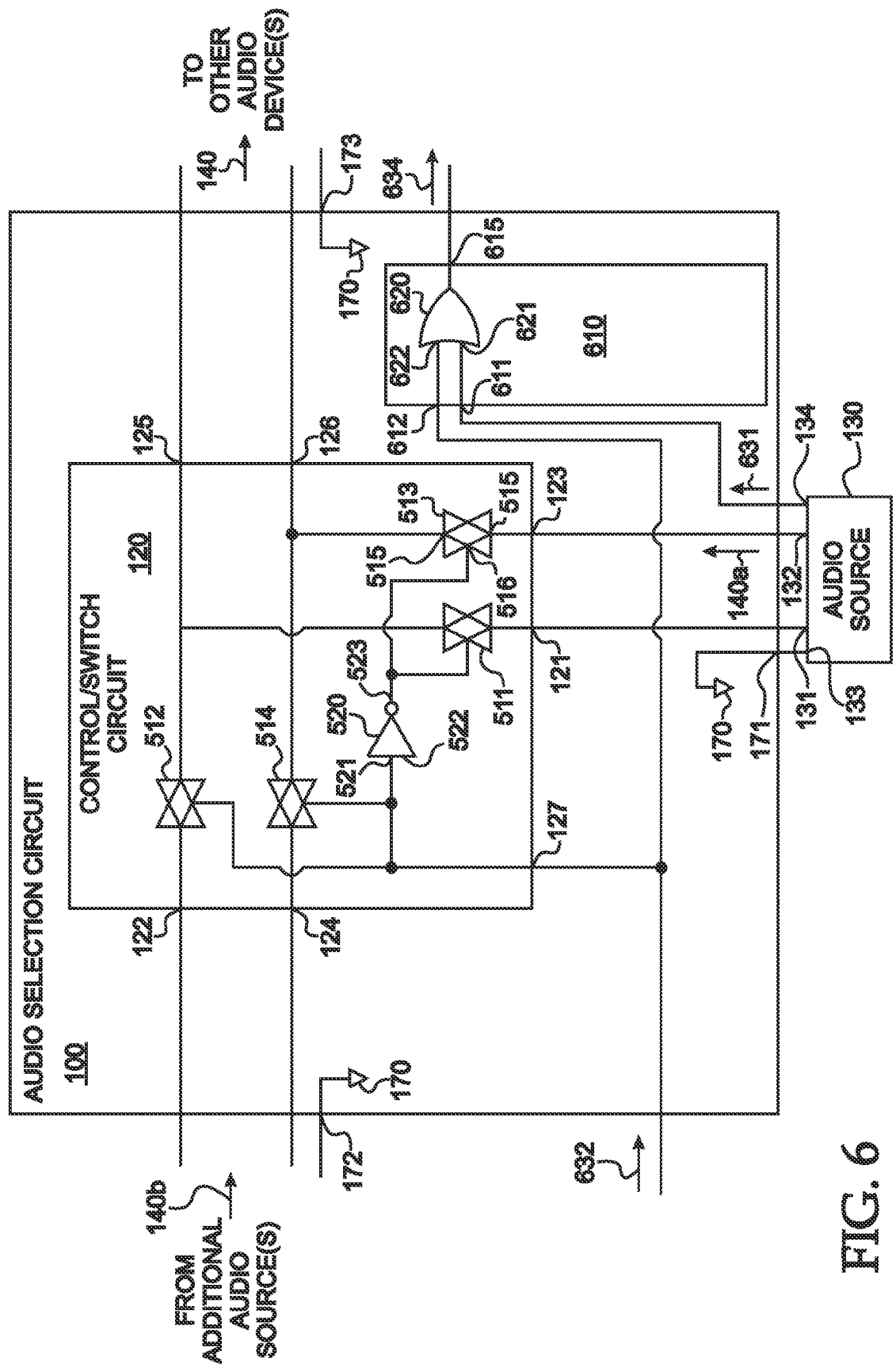
FIG. 6 is a diagram of still another audio selection circuit as described in various representative embodiments.

FIG. 6 is a diagram of still another audio selection circuit 100 as described in various representative embodiments. In FIG. 6, the audio selection circuit 100 comprises a logic control module 610 and the control/switch circuit 120. The logic control module 610 has a first logic module input 611, a second logic module input 612, and a logic module output 615. The control/switch circuit 120 has a first input 121, a second input 122, a third input 123, a fourth input 124, a first output 125, a second output 126, and a control input 127. Internally the control/switch circuit 120 is connected as shown in FIG. 5 and as described above. The second and the fourth inputs 122,124 are available for connection to first and second outputs 125,126 of an optional additional audio selection circuit 100 as shown in FIGS. 2 and 4. Also, the first and the second outputs 125,126 are available for connection to second and fourth inputs 122,124 of an optional additional audio selection circuit 100 or to the inputs of an audio output device 410 as shown or indicated in FIGS. 2 and 4. A first presence signal 631 can be received on the first logic module input 611; a second presence signal 632 can be received on the second logic module input 612; and a logic output signal 634, which may also be referred to herein as presence output signal 634, is outputted on the logic module output 615.

In this representative embodiment, the logic control module 610 comprises an OR circuit 620. The OR circuit 620 has a first OR input 621, a second OR input 622, and an OR output 623. The first OR input 621 is connected to the first logic module input 611; the second OR input 622 is connected to the second logic module input 612; and the OR output 623 is connected to the logic module output 615.

The second logic module input 612 is available for connection to the logic module output 615 of an optional, additional audio selection circuit 100 located to the left of the audio selection circuit 100 of FIG. 6 and is connected to the control input 127 of the control/switch circuit 120; the first logic module input 611 is available for electrical connection to an audio logic output 134 of the audio source 130; the logic module output 615 is available for connection to the second logic module input 612 of an optional, additional audio selection circuit 100 located to the right of the audio selection circuit 100 of FIG. 6 and would be connected to the control input 127 of the control/switch circuit 120 of that right located, additional audio selection circuit 100.

The presence of a logic "1" as the second presence signal 632 on the second logic module input 612 indicates the presence of the second audio signal 140b on the second and the fourth inputs 122,124. In a manner similar to that of FIG. 5, a logic "1" on the second logic module input 612 from the logic control module 610 of an additional audio selection circuit 100 located to the left of the audio selection circuit 100 of FIG. 6 turns off the first and the third analog transmission gates 511,513 and turns on the second and the fourth analog transmission gates 512,514. In which case, the second input 122 is connected to the first output 125, the fourth input 124 is connected to the second output 126, and the first and the third inputs 121,123 are disconnected respectively from the first output 125 and the second output 126.

Otherwise, a logic "0" as the second presence signal 632 is present on the second logic module input 612; the first and the third analog transmission gates 511,513 are turned on; and the second and the fourth analog transmission gates 512,514 are turned off. In this case, the first input 121 is connected to the first output 125; the third input 123 is connected to the second output 126; and the second and the fourth inputs 122,124 are disconnected respectively from the first output 125 and the second output 126.

If the audio source 130 is connected to the audio selection circuit 100 and if an audio signal 140a is outputted on at least one of the first and the second audio outputs 131,132, the audio source 130 will transmit a logic "1" to the first logic module input 611 from the audio logic output 134 as the first presence signal 631. If either the first or the second logic module input 611,612 receives a "1", a "1" will be placed by the OR circuit 620 on the logic module output 615 in logic output signal 634. Otherwise, a "0" will be placed by the OR circuit 620 on the logic module output 615 in logic output signal 634.

FIG. 6 as described above is configured for stereo audio inputs at paired first and third inputs 121,123 with first ground point 171 at chassis ground potential 170 connected to third audio output 133 and separately at second and fourth inputs 122,124 with second ground point 172 at chassis ground potential 170. Stereo audio output is obtained at paired first and second outputs 125,126 with third ground point 173 at chassis ground potential 170. For monaural input it is only necessary to use first input 121 with first ground point 171 at chassis ground potential 170 and separately only second input 122 with second ground point 172 also at chassis ground potential 170. And, for monaural output it is only necessary to use first output 125 with third ground point 173 at chassis ground potential 170.

Figure 7:
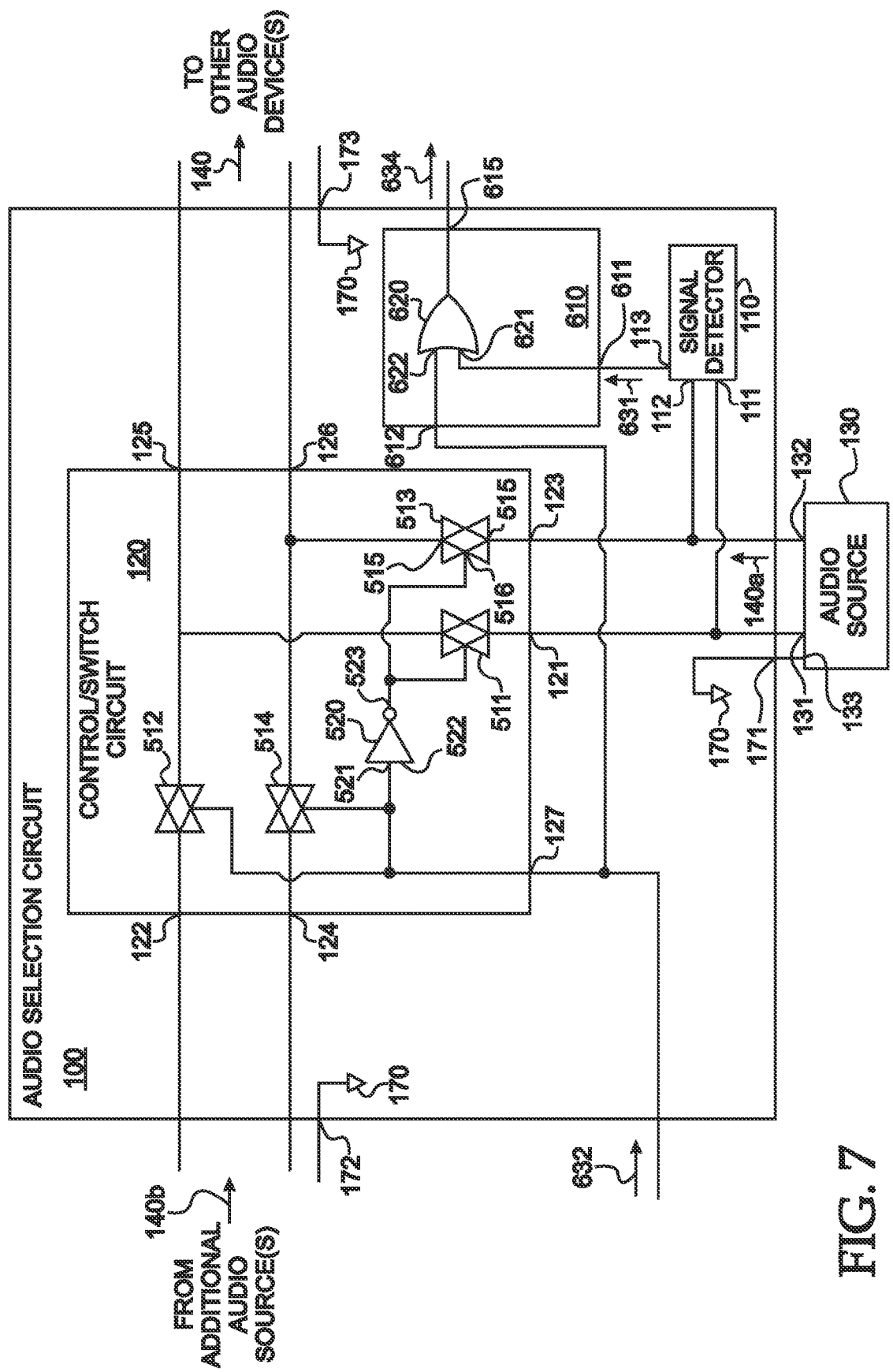
FIG. 7 is a diagram of yet another audio selection circuit as described in various representative embodiments.

FIG. 7 is a diagram of yet another audio selection circuit 100 as described in various representative embodiments. In FIG. 7, the audio selection circuit 100 comprises a logic control module 610, a signal detector module 110, and the control/switch circuit 120. The logic control module 610 has a first logic module input 611, a second logic module input 612, and a logic module output 615. The control/switch circuit 120 has a first input 121, a second input 122, a third input 123, a fourth input 124, a first output 125, a second output 126, and a control input 127. The second and the fourth inputs 122,124 are available for connection to first and second outputs 125,126 of an optional additional audio selection circuit 100 as shown in FIGS. 2 and 4. Also, the first and the second outputs 125,126 are available for connection to second and fourth inputs 122,124 of an optional additional audio selection circuit 100 or to the inputs of an audio output device 410 as shown or as indicated in FIGS. 2 and 4. A first presence signal 631 can be received on the first logic module input 611; a second presence signal 632 can be received on the second logic module input 612; and a logic output signal 634 is output on the logic module output 615.

In this representative embodiment, the logic control module 610 comprises an OR circuit 620. The OR circuit 620 has a first OR input 621, a second OR input 622, and an OR output 623. The signal detector module 110 has a first detector input 111, a second detector input 112, and a detector output 113. The first detector input 111 is connected to the first input 121 and is available for connection to the first audio output 131; and the second detector input 112 is connected to the third input 123 and is also available for connection to the second audio output 132. The first OR input 621 is connected to the detector output 113; the second OR input 622 is connected to the second logic module input 612; and the OR output 623 is connected to the logic module output 615.

As in FIG. 6, the second logic module input 612 is available for connection to the logic module output 615 of an optional, additional audio selection circuit 100 located to the left of the audio selection circuit 100 of FIG. 7 and is connected to the control input 127 of the control/switch circuit 120. The first logic module input 611 is electrically connected to the detector output 113, and the logic module output 615 is available for connection to the second logic module input 612 of an optional, additional audio selection circuit 100 located to the right of the audio selection circuit 100 of FIG. 7 and would also be connected to the control input 127 of the control/switch circuit 120 of that right located, additional audio selection circuit 100.

The presence of a logic "1" as the second presence signal 632 on the second logic module input 612 indicates the presence of the second audio signal 140b on the second and the fourth inputs 122,124. In a manner similar to that of FIG. 5, a logic "1" on the second logic module input 612 from the logic control module 610 of an additional audio selection circuit 100 located to the left of the audio selection circuit 100 of FIG. 6 turns off the first and the third analog transmission gates 511,513 and turns on the second and the fourth analog transmission gates 512,514. In which case, the second input 122 is connected to the first output 125, the fourth input 124 is connected to the second output 126, and the first and the third inputs 121,123 are disconnected respectively from the first output 125 and the second output 126.

Otherwise, a logic "0" as the second presence signal 632 is present on the second logic module input 612, and the first and the third analog transmission gates 511,513 are turned on with the second and the fourth analog transmission gates 512,514 are turned off. In this case, the first input 121 is connected to the first output 125; the third input 123 is connected to the second output 126; and the second and the fourth inputs 122,124 are disconnected respectively from the first output 125 and the second output 126.

If the audio source 130 is connected to the audio selection circuit 100 and if an audio signal 140a is outputted on at least one of the first and the second audio outputs 131,132, the signal detector module 110 will transmit a logic "1" to the first OR input 621 from the third detector output 113 as first presence signal 631. If either the first or the second OR input 621,622 receives a "1", a "1" will be placed on the logic module output 615 in logic output signal 634. Otherwise, a "0" will be placed by the OR circuit 620 on the logic module output 615 in logic output signal 634. Note that the logic output signal 634 is the same signal as the second presence signal 632 of an additional audio selection circuit 100 located to the right of the audio selection circuit 100 of FIG. 7.

FIG. 7 as described above is configured for stereo audio inputs at paired first and third inputs 121,123 with first ground point 171 at chassis ground potential 170 connected to third audio output 133 and separately at second and fourth inputs 122,124 with second ground point 172 at chassis ground potential 170. Stereo audio output is obtained at paired first and second outputs 125,126 with third ground point 173 at chassis ground potential 170. For monaural input it is only necessary to use first input 121 with first ground point 171 at chassis ground potential 170 and separately only second input 122 with second ground point 172 also at chassis ground potential 170. And, for monaural output it is only necessary to use first output 125 with third ground point 173 at chassis ground potential 170.

Figure 8:
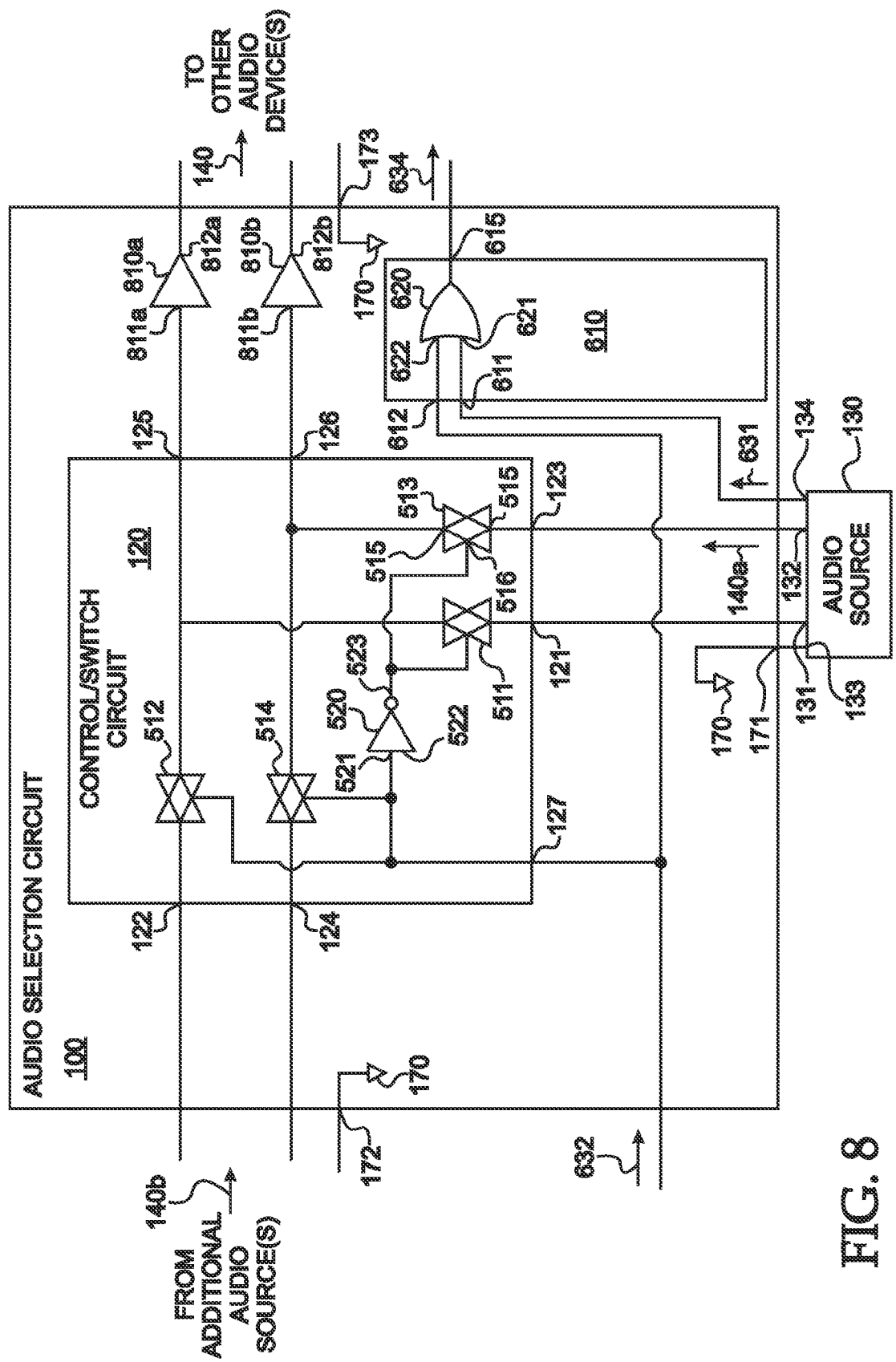
FIG. 8 is a diagram of still yet another audio selection circuit as described in various representative embodiments.

FIG. 8 is a diagram of still yet another audio selection circuit 100 as described in various representative embodiments. In addition to the elements found in FIG. 6, the audio selection circuit 100 of FIG. 8 also comprises two amplifiers 810a,810b. Amplifier 810a has an amplifier input 811a connected to the first output 125; amplifier 810a also has amplifier output 812a which is now one of the output contacts of the audio selection circuit 100; amplifier 810b has an amplifier input 811b connected to the second output 126; and amplifier 810b also has amplifier output 812b which is now the other of the output contacts of the audio selection circuit 100. Amplifiers 810a,810b are included in the audio selection circuit 100 to compensate for the loss/attenuation due to the impedance of the analog transmission gates 511,512,513,514.

FIG. 8 as described above is configured for stereo audio inputs. Monaural audio input/output using only one of the amplifiers 810a can be accommodated in a manner similar to that described above for FIG. 6.

Interface circuits are disclosed above for enabling the connection of one or more external, auxiliary devices to an automotive audio system without requiring additional controls on the control panel of the audio system. The circuits disclosed herein also permit the user to specify a relative priority to each of the attached auxiliary devices such that a device having a higher priority assigned to it will interrupt another device having a lower priority whenever a signal is received from the higher priority device.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. An audio selection circuit, comprising:
a control/switch circuit having a first input, a second input, and a first output; and
a signal detector module configured to detect an audio signal on the second input,
wherein if the signal detector detects presence of the audio signal on the second input:
the signal detector is configured to transmit a control signal to the control/switch circuit and the control/switch circuit is configured in response to the control signal to disconnect the first input from the first output and to connect the second input to the first output,
otherwise:
the control/switch circuit is configured to connect the first input to the first output and to disconnect the second input from the first output,
wherein the control/switch circuit comprises a non-latching, single-pole, double-throw relay switch having a relay coil, and a first switch section,
wherein the first switch section has a first pole connected to a first common terminal, a first first-throw terminal, and a first second-throw terminal,
wherein the first common terminal is connected to the first output,
wherein the first first-throw terminal is connected to the first input,
wherein the first second-throw terminal is connected to the second input, and
wherein if the control signal is received by the control/switch circuit:
the relay coil is activated, thereby forcing connection of the first pole to the first second-throw terminal,
otherwise:
the first pole is connected to the first first-throw terminal.

2. An audio selection circuit, comprising:
a control/switch circuit having a first input, a second input, and a first output; and
a signal detector module configured to detect an audio signal on the second input,
wherein if the signal detector detects presence of the audio signal on the second input:
the signal detector is configured to transmit a control signal to the control/switch circuit and the control/switch circuit is configured in response to the control signal to disconnect the first input from the first output and to connect the second input to the first output,
otherwise:
the control/switch circuit is configured to connect the first input to the first output and to disconnect the second input from the first output,
wherein the control/switch circuit comprises a single-pole, double-throw solid state switch having a first analog transmission gate with two transmission terminals and a second analog transmission gate with two transmission terminals,
wherein one transmission terminal of the first analog transmission gate is connected to the first input and the other transmission terminal is connected to the first output,
wherein one transmission terminal of the second analog transmission gate is connected to the second input and the other transmission terminal is connected to the first output, and
wherein if the control signal is received by the control/switch circuit:
the first analog transmission gate is forced into the OFF state and the second analog transmission gate is forced into the ON state, thereby disconnecting the first input from the first output and connecting the second input to the first output,
otherwise:
the first analog transmission gate is forced into the ON state and the second analog transmission gate is forced into the OFF state, thereby connecting the first input to the first output and disconnecting the second input from the first output.

3. An audio selection circuit, comprising:
a control/switch circuit having a first input, a second input, and a first output; and
a signal detector module configured to detect an audio signal on the second input,
wherein if the signal detector detects presence of the audio signal on the second input:
the signal detector is configured to transmit a control signal to the control/switch circuit and the control/switch circuit is configured in response to the control signal to disconnect the first input from the first output and to connect the second input to the first output,
otherwise:
the control/switch circuit is configured to connect the first input to the first output and to disconnect the second input from the first output,
wherein the audio selection circuit is constructed within an electronic plug housing of an electronic plug, wherein the electronic plug further comprises a male jack section having connection to the first output and a female receptacle section having connection to the second input, wherein the male jack section is configured to insert into the female receptacle section of another electronic plug, wherein the female receptacle section is configured to receive the male jack section of an additional electronic plug, and wherein the male jack section and the female receptacle section are configured such that if the male jack section of one electronic plug is inserted into the female receptacle section of another electronic plug, the first output connected to the inserted male jack section is connected to the second input connected to the receiving female receptacle section.

4. An audio selection circuit, comprising:
a control/switch circuit having a first input, a second input, and a first output; and
a signal detector module configured to detect an audio signal on the second input,
wherein if the signal detector detects presence of the audio signal on the second input:
the signal detector is configured to transmit a control signal to the control/switch circuit and the control/switch circuit is configured in response to the control signal to disconnect the first input from the first output and to connect the second input to the first output,
otherwise:
the control/switch circuit is configured to connect the first input to the first output and to disconnect the second input from the first output, wherein a first output of an additional audio selection circuit is connected to the second input of the audio selection circuit.

5. An audio selection circuit, comprising:
a control/switch circuit having a first input, a second input, a third input, a fourth input, a first output, and a second output; and
a signal detector module configured to detect an audio signal on the second and the fourth inputs,
wherein if the signal detector detects presence of the audio signal on at least one of the second and the fourth inputs:
the signal detector is configured to transmit a control signal to the control/switch circuit and the control/switch circuit is configured in response to the control signal to disconnect the first and the third inputs respectively from the first and the second outputs and to connect the second and the fourth inputs respectively to the first and the second outputs,
otherwise:
the control/switch circuit is configured to connect the first and the third inputs respectively to the first and the second outputs and to disconnect the second and the fourth inputs respectively from the first and the second outputs,
wherein the control/switch circuit comprises a non-latching, double-pole, double-throw relay switch having a relay coil, a first switch section, and a second switch section,
wherein the first switch section has a first pole connected to a first common terminal, a first first-throw terminal, and a first second-throw terminal,
wherein the second switch section has a second pole connected to a second common terminal, a second first-throw terminal, and a second second-throw terminal,
wherein the first common terminal is connected to the first output,
wherein the second common terminal is connected to the second output,
wherein the first first-throw terminal is connected to the first input,
wherein the first second-throw terminal is connected to the second input,
wherein the second first-throw terminal is connected to the third input,
wherein the second second-throw terminal is connected to the fourth input, and
wherein if the control signal is received by the control/switch circuit:
the relay coil is activated forcing connection of the first pole to the first second-throw terminal and forcing connection of the second pole to the second second-throw terminal,
otherwise:
the first pole is connected to the first first-throw terminal and the second pole is connected to the second first-throw terminal.

6. An audio selection circuit, comprising:
a control/switch circuit having a first input, a second input, a third input, a fourth input, a first output, and a second output; and
a signal detector module configured to detect an audio signal on the second and the fourth inputs,
wherein if the signal detector detects presence of the audio signal on at least one of the second and the fourth inputs:
the signal detector is configured to transmit a control signal to the control/switch circuit and the control/switch circuit is configured in response to the control signal to disconnect the first and the third inputs respectively from the first and the second outputs and to connect the second and the fourth inputs respectively to the first and the second outputs,
otherwise:
the control/switch circuit is configured to connect the first and the third inputs respectively to the first and the second outputs and to disconnect the second and the fourth inputs respectively from the first and the second outputs,
wherein the control/switch circuit comprises a double-pole, double-throw solid state switch having a first analog transmission gate with two transmission terminals, a second analog transmission gate with two transmission terminals, a third analog transmission gate with two transmission terminals, and a fourth analog transmission gate with two transmission terminals,
wherein one transmission terminal of the first analog transmission gate is connected to the first input and the other transmission terminal is connected to the first output,
wherein one transmission terminal of the second analog transmission gate is connected to the second input and the other transmission terminal is connected to the first output,
wherein one transmission terminal of the third analog transmission gate is connected to the third input and the other transmission terminal is connected to the second output,
wherein one transmission terminal of the fourth analog transmission gate is connected to the fourth input and the other transmission terminal is connected to the second output, and
wherein if the control signal is received by the control/switch circuit:
the first analog transmission gate is forced into the OFF state and the second analog transmission gate is forced into the ON state, thereby disconnecting the first input from the first output and connecting the second input to the first output and
the third analog transmission gate is forced into the OFF state and the fourth analog transmission gate is forced into the ON state, thereby disconnecting the third input from the second output and connecting the fourth input to the second output,
otherwise:
the first analog transmission gate is forced into the ON state and the second analog transmission gate is forced into the OFF state, thereby connecting the first input to the first output and disconnecting the second input from the first output and
the third analog transmission gate is forced into the ON state and the fourth analog transmission gate is forced into the OFF state, thereby connecting the third input to the second output and disconnecting the fourth input from the second output.

7. An audio selection circuit, comprising:
a control/switch circuit having a first input, a second input, a third input, a fourth input, a first output, and a second output; and
a signal detector module configured to detect an audio signal on the second and the fourth inputs,
wherein if the signal detector detects presence of the audio signal on at least one of the second and the fourth inputs:
the signal detector is configured to transmit a control signal to the control/switch circuit and the control/switch circuit is configured in response to the control signal to disconnect the first and the third inputs respectively from the first and the second outputs and to connect the second and the fourth inputs respectively to the first and the second outputs, otherwise:

the control/switch circuit is configured to connect the first and the third inputs respectively to the first and the second outputs and to disconnect the second and the fourth inputs respectively from the first and the second outputs, wherein the audio selection circuit is constructed within an electronic plug housing of an electronic plug, wherein the electronic plug further comprises a male jack section having connections to the first and the second outputs and a female receptacle section having connections to the second and the fourth inputs, wherein the male jack section is configured to insert into the female receptacle section of another electronic plug, wherein the female receptacle section is configured to receive the male jack section of an additional electronic plug, and wherein the male jack section and the female receptacle section are configured such that if the male jack section of one electronic plug is inserted into the female receptacle section of another electronic plug, the first and second outputs connected to the inserted male jack section are connected respectively to the second and the fourth inputs connected to the receiving female receptacle section.

8. An audio selection circuit, comprising:

a control/switch circuit having a first input, a second input, a third input, a fourth input, a first output, and a second output; and a signal detector module configured to detect an audio signal on the second and the fourth inputs, wherein if the signal detector detects presence of the audio signal on at least one of the second and the fourth inputs:

the signal detector is configured to transmit a control signal to the control/switch circuit and the control/switch circuit is configured in response to the control signal to disconnect the first and the third inputs respectively from the first and the second outputs and to connect the second and the fourth inputs respectively to the first and the second outputs, otherwise:

the control/switch circuit is configured to connect the first and the third inputs respectively to the first and the second outputs and to disconnect the second and the fourth inputs respectively from the first and the second outputs, wherein first and second outputs of an additional audio selection circuit are connected respectively to the second and fourth inputs of the audio selection circuit.

9. An audio selection circuit, comprising:

a control/switch circuit having a first input, a second input, and a first output;

a logic control module having a first logic module input configured to receive a first presence signal and a second logic module input configured to receive a second presence signal, wherein the first presence signal indicates presence or absence of an audio signal on the first input, wherein the second presence signal indicates presence or absence of an additional audio signal on the second input, wherein if the second presence signal indicates presence of the additional audio signal:

the control/switch circuit is configured to disconnect the first input from the first output and to connect the second input to the first output, otherwise:

the control/switch circuit is configured to connect the first input to the first output and to disconnect the second input from the first output, and wherein if at least one of the first and the second presence signals indicates presence of its associated audio signal:

the logic control module outputs a presence output signal indicating presence of one of the two audio signals on the first output, otherwise:

the logic control module outputs the presence output signal indicating absence of both the audio signals on the first output, wherein the control/switch circuit comprises a single-pole, double-throw solid state switch having a first analog transmission gate with two transmission terminals and having a second analog transmission gate with two transmission terminals, wherein one transmission terminal of the first analog transmission gate is connected to the first input and the other transmission terminal is connected to the first output, wherein one transmission terminal of the second analog transmission gate is connected to the second input and the other transmission terminal is connected to the first output, and wherein if the second presence signal received by the audio selection circuit indicates presence of the additional audio signal on the second input:

the first analog transmission gate is forced into the OFF state and the second analog transmission gate is forced into the ON state, thereby disconnecting the first input from the first output and connecting the second input to the first output, otherwise:

the first analog transmission gate is forced into the ON state and the second analog transmission gate is forced into the OFF state, thereby connecting the first input to the first output and disconnecting the second input from the first output.

10. An audio selection circuit, comprising:

a control/switch circuit having a first input, a second input, and a first output;

a logic control module having a first logic module input configured to receive a first presence signal and a second logic module input configured to receive a second presence signal, wherein the first presence signal indicates presence or absence of an audio signal on the first input, wherein the second presence signal indicates presence or absence of an additional audio signal on the second input, wherein if the second presence signal indicates presence of the additional audio signal:

the control/switch circuit is configured to disconnect the first input from the first output and to connect the second input to the first output, otherwise:

the control/switch circuit is configured to connect the first input to the first output and to disconnect the second input from the first output, and wherein if at least one of the first and the second presence signals indicates presence of its associated audio signal:

the logic control module outputs a presence output signal indicating presence of one of the two audio signals on the first output, otherwise:

the logic control module outputs the presence output signal indicating absence of both the audio signals on the first output, wherein if an audio source having a first audio output connected to the first input and having an audio logic output connected to the first logic module input transmits the audio signal onto the first audio output:

the audio source is configured to inform the logic control module of the presence of the audio signal on the first audio output via the first presence signal on the audio logic output, otherwise:

the audio source is configured to inform the logic control module of the absence of the audio signal on the first audio output via the first presence signal on the audio logic output.

11. An audio selection circuit, comprising:

a control/switch circuit having a first input, a second input, and a first output;

a logic control module having a first logic module input configured to receive a first presence signal and a second logic module input configured to receive a second presence signal, wherein the first presence signal indicates presence or absence of an audio signal on the first input, wherein the second presence signal indicates presence or absence of an additional audio signal on the second input, wherein if the second presence signal indicates presence of the additional audio signal:

the control/switch circuit is configured to disconnect the first input from the first output and to connect the second input to the first output, otherwise:

the control/switch circuit is configured to connect the first input to the first output and to disconnect the second input from the first output, and wherein if at least one of the first and the second presence signals indicates presence of its associated audio signal:

the logic control module outputs a presence output signal indicating presence of one of the two audio signals on the first output, otherwise:

the logic control module outputs the presence output signal indicating absence of both the audio signals on the first output, wherein the audio selection circuit further comprises a signal detector module having a first detector input connected to the first input, having a detector output connected to the first logic module input, and configured to detect the presence of the audio signal on the first detector input and wherein if an audio source having a first audio output connected to the first input transmits the audio signal onto the first audio output:

the signal detector module is configured to inform the logic control module of the presence of the audio signal on the first detector input via the first presence signal on the detector output, otherwise:

the signal detector module is configured to inform the logic control module of the absence of the audio signal on the first detector input via the first presence signal on the detector output.

12. An audio selection circuit, comprising:

a control/switch circuit having a first input, a second input, and a first output;

a logic control module having a first logic module input configured to receive a first presence signal and a second logic module input configured to receive a second presence signal, wherein the first presence signal indicates presence or absence of an audio signal on the first input, wherein the second presence signal indicates presence or absence of an additional audio signal on the second input, wherein if the second presence signal indicates presence of the additional audio signal:

the control/switch circuit is configured to disconnect the first input from the first output and to connect the second input to the first output, otherwise:

the control/switch circuit is configured to connect the first input to the first output and to disconnect the second input from the first output, and wherein if at least one of the first and the second presence signals indicates presence of its associated audio signal:

the logic control module outputs a presence output signal indicating presence of one of the two audio signals on the first output, otherwise:

the logic control module outputs the presence output signal indicating absence of both the audio signals on the first output, wherein the audio selection circuit is constructed within an electronic plug housing of an electronic plug, wherein the electronic plug further comprises a male jack section having connection to the first output and a female receptacle section having connection to the second input, wherein the male jack section is configured to insert into the female receptacle section of another electronic plug, wherein the female receptacle section is configured to receive the male jack section of an additional electronic plug, and wherein the male jack section and the female receptacle section are configured such that if the male jack section of one electronic plug is inserted into the female receptacle section of another electronic plug, the first output connected to the inserted male jack section is connected to the second input connected to the receiving female receptacle section.

13. An audio selection circuit, comprising:

a control/switch circuit having a first input, a second input, and a first output;

a logic control module having a first logic module input configured to receive a first presence signal and a second logic module input configured to receive a second presence signal, wherein the first presence signal indicates presence or absence of an audio signal on the first input, wherein the second presence signal indicates presence or absence of an additional audio signal on the second input, wherein if the second presence signal indicates presence of the additional audio signal:

the control/switch circuit is configured to disconnect the first input from the first output and to connect the second input to the first output, otherwise:

the control/switch circuit is configured to connect the first input to the first output and to disconnect the second input from the first output, and wherein if at least one of the first and the second presence signals indicates presence of its associated audio signal:

the logic control module outputs a presence output signal indicating presence of one of the two audio signals on the first output, otherwise:

the logic control module outputs the presence output signal indicating absence of both the audio signals on the first output, wherein a first output of an additional audio selection circuit is connected to the second input of the audio selection circuit.

14. An audio selection circuit, comprising:

a control/switch circuit having a first input, a second input, a third input, a fourth input, a first output, and a second output;

a logic control module having a first logic module input configured to receive a first presence signal and a second logic module input configured to receive a second presence signal, wherein the first presence signal indicates presence or absence of an audio signal on at least one of the first and third inputs, wherein the second presence signal indicates presence or absence of an additional audio signal on at least one of the second and fourth inputs, wherein if the second presence signal indicates presence of the additional audio signal:

the control/switch circuit is configured to disconnect the first input from the first output, to disconnect the third input from the second output, to connect the second input to the first output, and to connect the fourth input to the second output, otherwise:

the control/switch circuit is configured to connect the first input to the first output, to connect the third input to the second output, to disconnect the second input from the first output, and to disconnect the fourth input from the second output, and wherein if at least one of the first and the second presence signals indicates presence of its associated audio signal:

the logic control module outputs a presence output signal indicating presence of one of the two audio signals on at least one of the first and the second outputs, otherwise:

the logic control module outputs the presence output signal indicating absence of the audio signals on both the first and the second outputs, wherein the control/switch circuit comprises a double-pole, double-throw solid state switch having a first analog transmission gate with two transmission terminals, a second analog transmission gate with two transmission terminals, a third analog transmission gate with two transmission terminals, and a fourth analog transmission gate with two transmission terminals, wherein one transmission terminal of the first analog transmission gate is connected to the first input and the other transmission terminal is connected to the first output, wherein one transmission terminal of the second analog transmission gate is connected to the second input and the other transmission terminal is connected to the first output, wherein one transmission terminal of the third analog transmission gate is connected to the third input and the other transmission terminal is connected to the second output, wherein one transmission terminal of the fourth analog transmission gate is connected to the fourth input and the other transmission terminal is connected to the second output, and wherein if the second presence signal received by the audio selection circuit indicates presence of the additional audio signal on at least one of the second and the fourth inputs:

the first analog transmission gate is forced into the OFF state and the second analog transmission gate is forced into the ON state, thereby disconnecting the first input from the first output and connecting the second input to the first output and the third analog transmission gate is forced into the OFF state and the fourth analog transmission gate is forced into the ON state, thereby disconnecting the third input from the second output and connecting the fourth input to the second output, otherwise:

the first analog transmission gate is forced into the ON state and the second analog transmission gate is forced into the OFF state, thereby connecting the first input to the first output and disconnecting the second input from the first output and the third analog transmission gate is forced into the ON state and the fourth analog transmission gate is forced into the OFF state, thereby connecting the third input to the second output and disconnecting the fourth input from the second output.

15. An audio selection circuit, comprising:

a control/switch circuit having a first input, a second input, a third input, a fourth input, a first output, and a second output;

a logic control module having a first logic module input configured to receive a first presence signal and a second logic module input configured to receive a second presence signal, wherein the first presence signal indicates presence or absence of an audio signal on at least one of the first and third inputs, wherein the second presence signal indicates presence or absence of an additional audio signal on at least one of the second and fourth inputs, wherein if the second presence signal indicates presence of the additional audio signal:

the control/switch circuit is configured to disconnect the first input from the first output, to disconnect the third input from the second output, to connect the second input to the first output, and to connect the fourth input to the second output, otherwise:

the control/switch circuit is configured to connect the first input to the first output, to connect the third input to the second output, to disconnect the second input from the first output, and to disconnect the fourth input from the second output, and wherein if at least one of the first and the second presence signals indicates presence of its associated audio signal:

the logic control module outputs a presence output signal indicating presence of one of the two audio signals on at least one of the first and the second outputs, otherwise:

the logic control module outputs the presence output signal indicating absence of the audio signals on both the first and the second outputs, wherein if an audio source having a first audio output connected to the first input, having a second audio output connected to the third input, and having an audio logic output connected to the first logic module input transmits the audio signal onto at least one of the first and the second audio outputs:

the audio source is configured to inform the logic control module of the presence of the audio signal on the at least one of the first and second audio outputs via the first presence signal on the audio logic output, otherwise:

the audio source is configured to inform the logic control module of the absence of the audio signal on both the first and the second audio outputs via the first presence signal on the audio logic output.

16. An audio selection circuit, comprising:

a control/switch circuit having a first input, a second input, a third input, a fourth input, a first output, and a second output;

a logic control module having a first logic module input configured to receive a first presence signal and a second logic module input configured to receive a second presence signal, wherein the first presence signal indicates presence or absence of an audio signal on at least one of the first and third inputs, wherein the second presence signal indicates presence or absence of an additional audio signal on at least one of the second and fourth inputs, wherein if the second presence signal indicates presence of the additional audio signal:

the control/switch circuit is configured to disconnect the first input from the first output, to disconnect the third input from the second output, to connect the second input to the first output, and to connect the fourth input to the second output, otherwise:

the control/switch circuit is configured to connect the first input to the first output, to connect the third input to the second output, to disconnect the second input from the first output, and to disconnect the fourth input from the second output, and wherein if at least one of the first and the second presence signals indicates presence of its associated audio signal:

the logic control module outputs a presence output signal indicating presence of one of the two audio signals on at least one of the first and the second outputs, otherwise:

the logic control module outputs the presence output signal indicating absence of the audio signals on both the first and the second outputs, wherein the audio selection circuit further comprises a signal detector module having a first detector input connected to the first input, having a second detector input connected to the third input, having a detector output connected to the first logic module input, and configured to detect the presence of the audio signal on the first and the second detector inputs, wherein if an audio source having a first audio output connected to the first input and having a second audio output connected to the third input transmits the audio signal onto at least one of the first and the second audio outputs:

the signal detector module is configured to inform the logic control module of the presence of the audio signal on at least one of the first and the second detector inputs via the first presence signal on the detector output, otherwise:

the signal detector module is configured to inform the logic control module of the absence of the audio signal on both the first and the second detector inputs via the first presence signal on the detector output.

17. An audio selection circuit, comprising:

a control/switch circuit having a first input, a second input, a third input, a fourth input, a first output, and a second output;

a logic control module having a first logic module input configured to receive a first presence signal and a second logic module input configured to receive a second presence signal, wherein the first presence signal indicates presence or absence of an audio signal on at least one of the first and third inputs, wherein the second presence signal indicates presence or absence of an additional audio signal on at least one of the second and fourth inputs, wherein if the second presence signal indicates presence of the additional audio signal:

the control/switch circuit is configured to disconnect the first input from the first output, to disconnect the third input from the second output, to connect the second input to the first output, and to connect the fourth input to the second output, otherwise:

the control/switch circuit is configured to connect the first input to the first output, to connect the third input to the second output, to disconnect the second input from the first output, and to disconnect the fourth input from the second output, and wherein if at least one of the first and the second presence signals indicates presence of its associated audio signal:

the logic control module outputs a presence output signal indicating presence of one of the two audio signals on at least one of the first and the second outputs, otherwise:

the logic control module outputs the presence output signal indicating absence of the audio signals on both the first and the second outputs, wherein the audio selection circuit is constructed within an electronic plug housing of an electronic plug, wherein the electronic plug further comprises a male jack section having connections to the first and the second outputs and a female receptacle section having connections to the second and the fourth inputs, wherein the male jack section is configured to insert into the female receptacle section of another electronic plug, wherein the female receptacle section is configured to receive the male jack section of an additional electronic plug, and wherein the male jack section and the female receptacle section are configured such that if the male jack section of one electronic plug is inserted into the female receptacle section of another electronic plug, the first and second outputs connected to the inserted male jack section are connected respectively to the second and the fourth inputs connected to the receiving female receptacle section.

18. An audio selection circuit, comprising:
a control/switch circuit having a first input, a second input, a third input, a fourth input, a first output, and a second output;
a logic control module having a first logic module input configured to receive a first presence signal and a second logic module input configured to receive a second presence signal,
  wherein the first presence signal indicates presence or absence of an audio signal on at least one of the first and third inputs,
  wherein the second presence signal indicates presence or absence of an additional audio signal on at least one of the second and fourth inputs,
  wherein if the second presence signal indicates presence of the additional audio signal:
    the control/switch circuit is configured to disconnect the first input from the first output, to disconnect the third input from the second output, to connect the second input to the first output, and to connect the fourth input to the second output,
  otherwise:
    the control/switch circuit is configured to connect the first input to the first output, to connect the third input to the second output, to disconnect the second input from the first output, and to disconnect the fourth input from the second output, and
  wherein if at least one of the first and the second presence signals indicates presence of its associated audio signal:
    the logic control module outputs a presence output signal indicating presence of one of the two audio signals on at least one of the first and the second outputs,
  otherwise:
    the logic control module outputs the presence output signal indicating absence of the audio signals on both the first and the second outputs,
wherein first and second outputs of an additional audio selection circuit are connected respectively to the second and fourth inputs of the audio selection circuit.

* * * * *